United States Patent [19]

Horst

[11] Patent Number: 5,111,096
[45] Date of Patent: May 5, 1992

[54] ISOLATED SEGMENTAL SWITCH RELUCTANCE MOTOR

[75] Inventor: Gary E. Horst, Manchester, Mo.

[73] Assignee: Emerson Electric Co., St. Louis, Mo.

[21] Appl. No.: 670,313

[22] Filed: Mar. 15, 1991

[51] Int. Cl.$^5$ .................... H02K 15/02; H02K 3/18
[52] U.S. Cl. ......................................... 310/168; 310/42; 310/179; 310/254; 310/261; 29/596
[58] Field of Search ............ 310/168, 254, 179, 185, 310/216, 217, 261, 258, 184, 42; 29/596, 606

[56] References Cited

U.S. PATENT DOCUMENTS

| | | | |
|---|---|---|---|
| 3,062,979 | 11/1962 | Jarret et al. | 310/168 |
| 4,647,802 | 3/1987 | Konecny | 310/168 |
| 4,733,117 | 3/1988 | Perrins | 310/168 |
| 4,883,999 | 11/1989 | Hendershot | 310/254 |
| 4,995,159 | 2/1991 | Hancock et al. | 29/596 |

Primary Examiner—Steven L. Stephan
Assistant Examiner—Matthew Nguyen
Attorney, Agent, or Firm—Polster, Lieder, Woodruff & Lucchesi

[57] ABSTRACT

A switched reluctance motor has a stator with a plurality of salient motor poles disposed about a central bore. A rotor having an even number of rotor poles is disposed for rotation in the central bore. Magnetizing phase windings are associated with the stator poles for selectively generating magnetic fields which extend from the stator poles into the central bore and define an even number of phases. The windings are disposed such that each stator pole is adjacent two phase windings of opposite polarity with the magnetic flux through each stator varying in direction with the energization of the various phases. The rotor includes a plurality of rotor segments disposed about the periphery of the rotor. Each segment is magnetically active and defines a pair of spaced rotor poles. The spacing between rotor poles for a given rotor segment is substantially the same as that between adjacent stator poles. The rotor further includes non-magnetic material disposed between the rotor segments to magnetically isolate one rotor segment from another so magnetic flux between an adjacent pair of stator poles only passes through the nearest rotor segment. The non-magnetic material provides structural integrity to the rotor and holds the rotor segments fixedly in place.

16 Claims, 7 Drawing Sheets

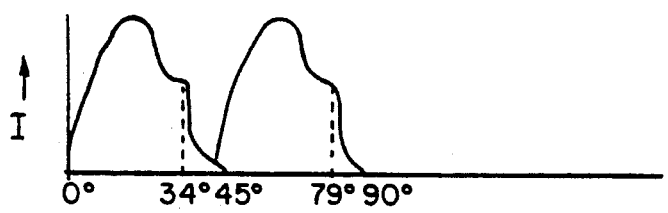
FIG. 3A.
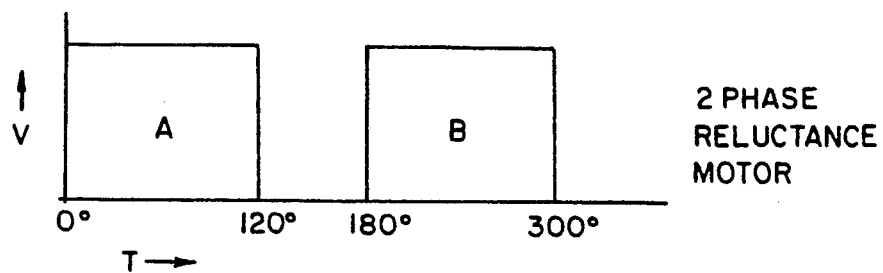
2 PHASE RELUCTANCE MOTOR
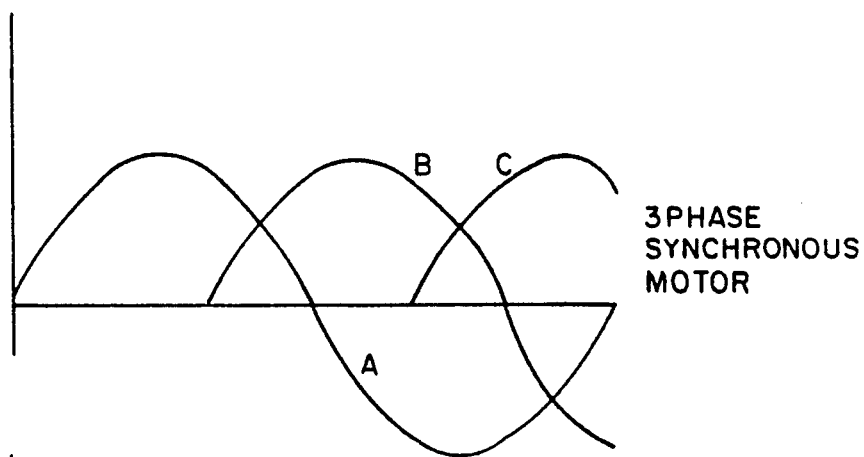
3 PHASE SYNCHRONOUS MOTOR
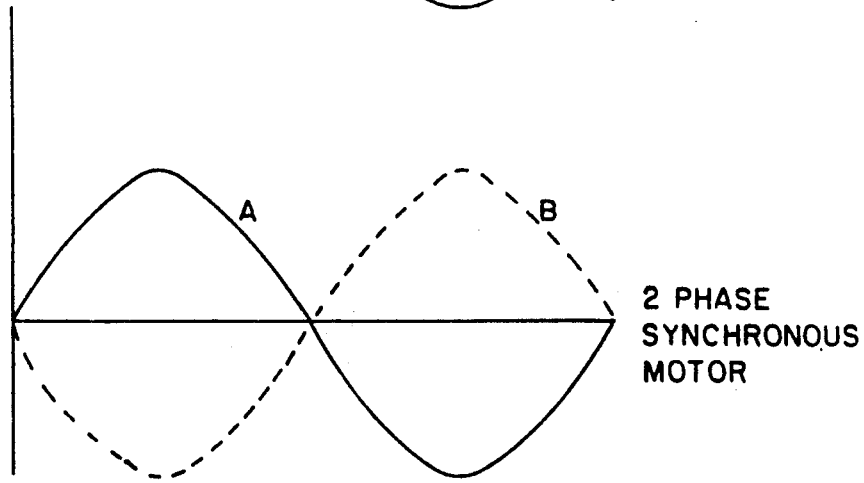
2 PHASE SYNCHRONOUS MOTOR
FIG. 3B.

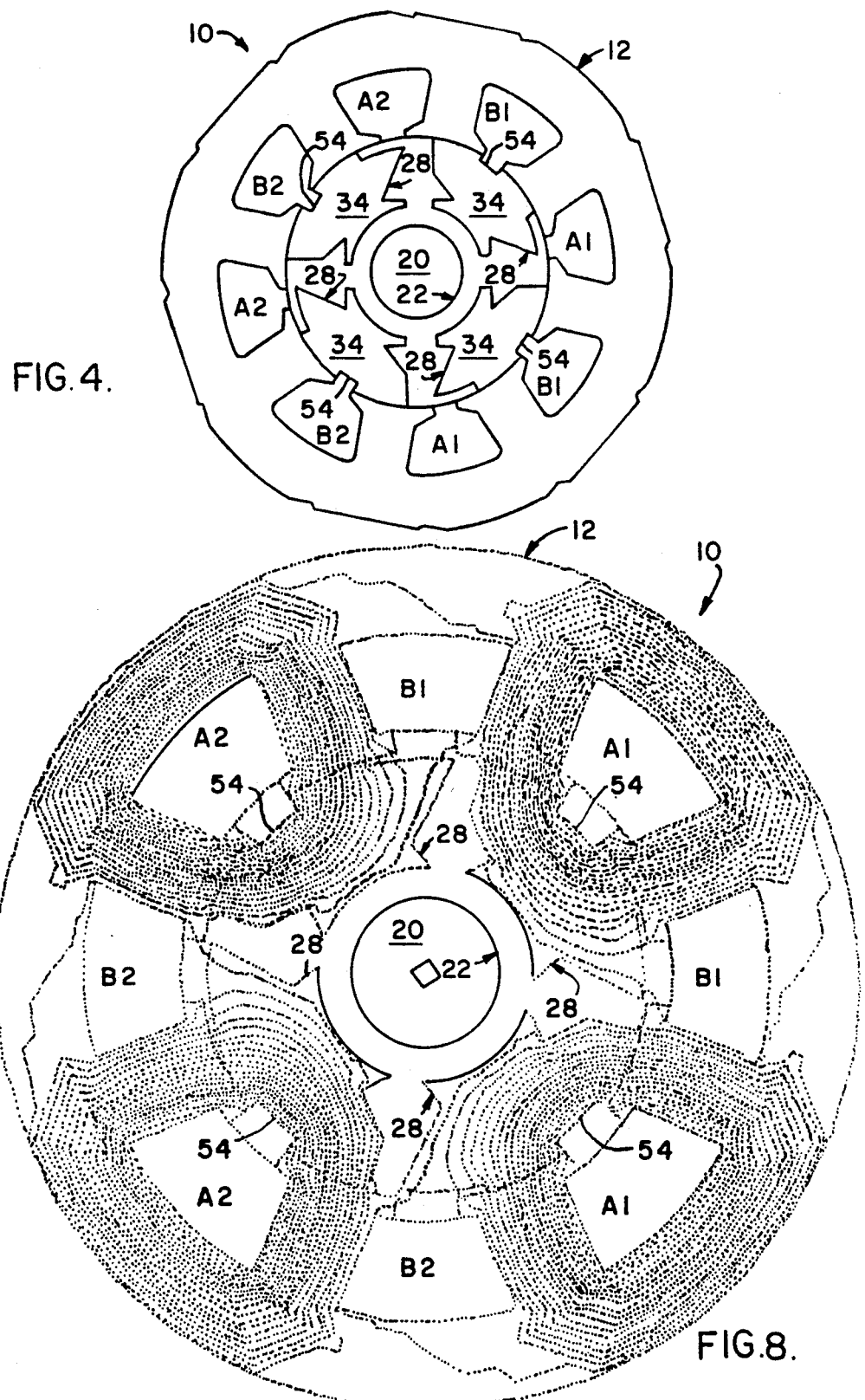

ISOLATED SEGMENTAL SWITCH RELUCTANCE MOTOR

BACKGROUND OF THE INVENTION

This invention relates to switched reluctance motors and more particularly, to a switched reluctance motor having an improved rotor design which reduces flux path lengths and utilites all salient poles thereby increasing power density and reducing motor losses.

Switched reluctance motors are well-known in the art. Typically these are multi-pole motors having poles or teeth on both the motor stator and rotor. The motor also has phase windings on the stator but not on the rotor. In addition, the rotor has saliency so formed as to produce synchronous motor operation. In operation, the rotor rotates to bring a pair of rotor poles into a minimum reluctance position with respect to a pair of stator poles. Currents in the motor are unipolar, flowing through the stator windings in only one direction. For such motors, a reversal of direction is achieved by changing the sequence in which windings are energized during a motor revolution. The advantage of reluctance motors is that they are efficient in converting electrical energy into mechanical work, and are reliable because of their mechanical simplicity.

Among the design considerations involved with switched reluctance motors are such things as the power densities which can be developed with a particular configuration, the amount of iron or other magnetic material which must be used in the motor, starting characteristics of the motor, etc. Rotor design has particular importance in these areas, especially with respect to such factors as the construction of the rotor teeth and the rotor core, and the size of the air gap between the rotor and stator. Different rotor designs are known. See, for example, U.S. Pat. No. 3,062,979. There, rotor teeth are formed by interspersing sheets of magnetic material with non-magnetic material. Such an approach is of interest because it reduces the amount of magnetic material required in the motor construction. However, other approaches may be more economical, not only with regard to construction of the rotor's teeth, but to also further reduce the amount of magnetic material in the motor, improve its efficiency, and permit it to be smaller in size than prior switched reluctance motors.

SUMMARY OF THE INVENTION

Among the several objects of the present invention may be noted the provision of a switched reluctance motor; the provision of such a motor having an even number of phases; the provision of such a motor having a segmented rotor in which the rotor segments are comprised of laminates of magnetic material installed in a frame of non-magnetic material; the provision of such a motor which is preferably a unidirectionally rotating motor having good starting characteristics because minimum and maximum inductances do not coincide for each phase as occurs in reversing motors; the provision of such a motor in which flux path lengths are reduced; the provision of such a motor utilizing all poles in each energy conversion cycle; the provision of such a motor utilizing a stepped overhang section of the rotor segments to accomplish motor starting; the provision of such a motor having increased power density and reduced losses; and, the provision of such a motor which can be made smaller than prior art switched reluctance motors providing comparable performance.

In accordance with the invention, generally stated, a switched reluctance motor has a stator with a plurality of salient motor poles disposed about a central bore. A rotor having an even number of rotor poles is disposed for rotation in the central bore. Magnetizing phase windings are associated with the stator poles for selectively generating magnetic fields which extend from the stator poles into the central bore and define an even number of phases. The windings are disposed such that each stator pole is adjacent two phase windings of opposite polarity with the magnetic flux through each stator varying in direction with the energization of the various phases. The rotor includes a plurality of rotor segments disposed about the periphery of the rotor. Each segment is magnetically active and defines a pair of spaced rotor poles. The spacing between rotor poles for a given rotor segment is substantially the same as that between adjacent stator poles. The rotor further includes non-magnetic material disposed between the rotor segments to magnetically isolate one rotor segment from another so magnetic flux between an adjacent pair of stator poles only passes through the nearest rotor segment. The non-magnetic material provides structural integrity to the rotor and holds the rotor segments fixedly in place. Other objects and features will be in part apparent and in part pointed out hereinafter.

BRIEF DESCRIPTION OF THE DRAWINGS

FIGS. 3a is a current waveform for the motor;

FIG. 3b illustrates a voltage waveform for the motor in comparison with voltage waveforms for 2-phase and 3-phase synchronous motors;

FIGS. 4-7 are end views of the motors at respective points in a cycle of motor operation;

FIGS. 8-12 are flux diagrams showing relevant levels of permeance at various points in the operating cycle; and, Corresponding reference characters indicate corresponding parts throughout the drawings.

DESCRIPTION OF A PREFERRED EMBODIMENT

Figure 1:
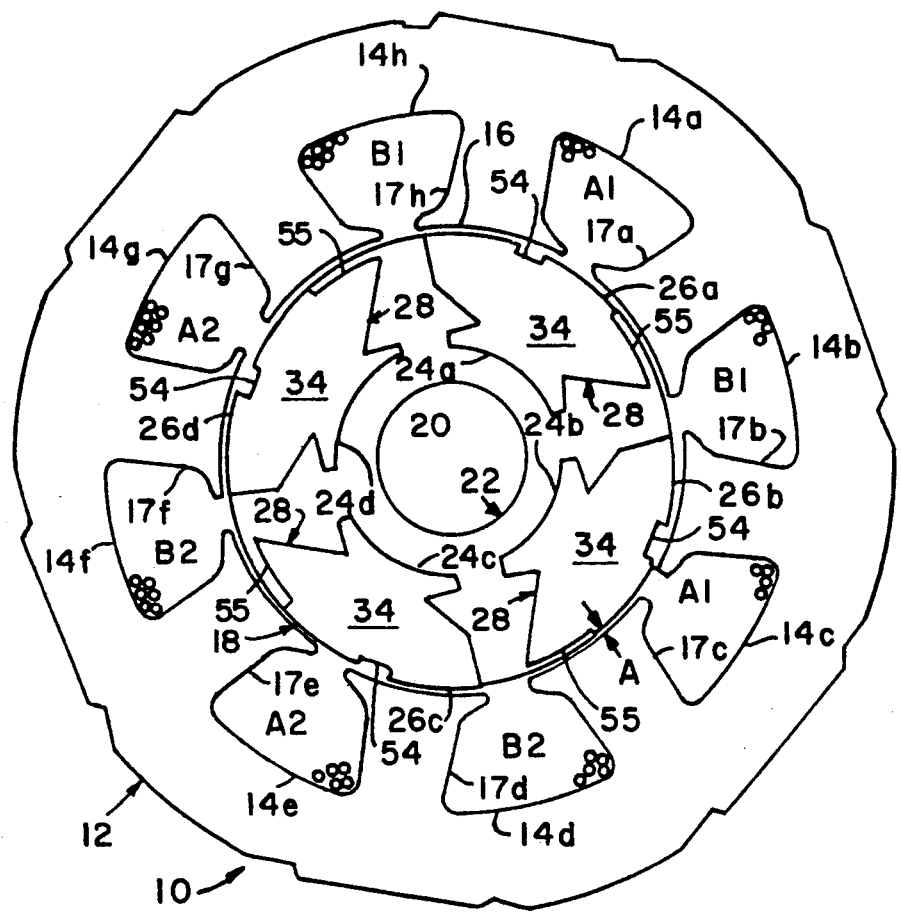
FIG. 1 is an end view of a switched reluctance motor of the present invention.

Referring to the drawings, a switched reluctance motor 10 is a poly-phase motor, preferably a 2-phase motor. The motor has a stator 12. The stator has a plurality of salient motor poles 14a-14h disposed about a central bore 16 and defining a plurality of teeth 17a-7h. In accordance with the invention, the number of stator poles is even, and while eight poles and eight teeth are shown in the stator of FIG. 1, the stator can have a different even number of poles and teeth. A rotor assembly 18 mounted on an axial shaft 20 is installed within bore 16 and is disposed for rotation therewithin. The outer diameter of the rotor assembly is less than the diameter of bore 16 so an air gap A is formed between the stator and rotor assembly. Magnetizing phase windings A1, B1, A2, and B2, are installed in the stator poles for selectively generating magnetic fields. As will be discussed with respect to FIGS. 8-12, the fields produced extend from the stator poles into the central bore. The windings are disposed such that each stator pole is adjacent two phase windings of opposite polarity. The magnetic flux through each stator varies in direction with the energization of the various phases. Current flows through the magnetizing windings only in one direction. Consequently, motor 10 is a unidirectional motor in which the rotor rotates clockwise with respect to the stator, as shown in FIG. 1.

Referring to FIGS. 2a-2d, the rotor assembly includes a molded frame 22 (FIG. 2c) in which is formed an even number (four) of slots 24a-24d. Respective rotor poles 26a-26d are formed in these slots. The rotor poles are defined by segments of magnetically active material inserted in the slots. Each segment defines a pair of spaced rotor poles. The frame also comprises non-magnetic material disposed between the rotor segments to magnetically isolate one rotor segment from another. Thus, magnetic flux between an adjacent pair of stator poles only passes through the nearest rotor segment. The non-magnetic material further provides structural integrity to the rotor and holds the rotor segments fixedly in place.

Figure 2E:
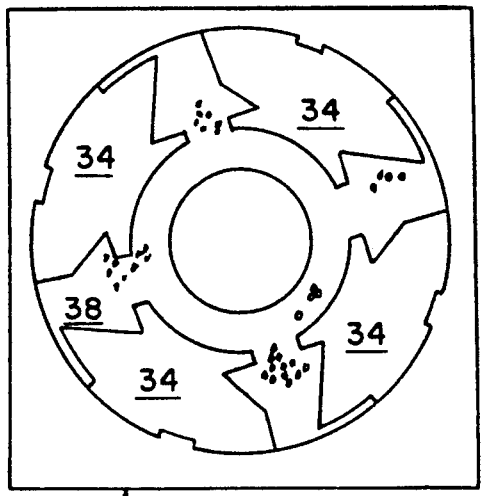
FIG. 2e illustrates a mold in which the rotor assembly is formed.
Figure 2A:
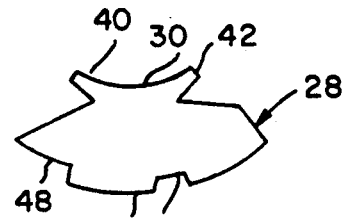
FIG. 2a is a plan view of a stackable rotor segment used in forming the rotor assembly of the motor.
Figure 2B:
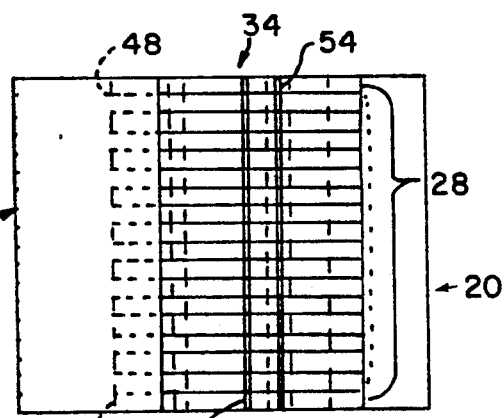
FIG. 2b represents a stack of the segments in a die or mold for forming a rotor for the motor.
Figure 2C:
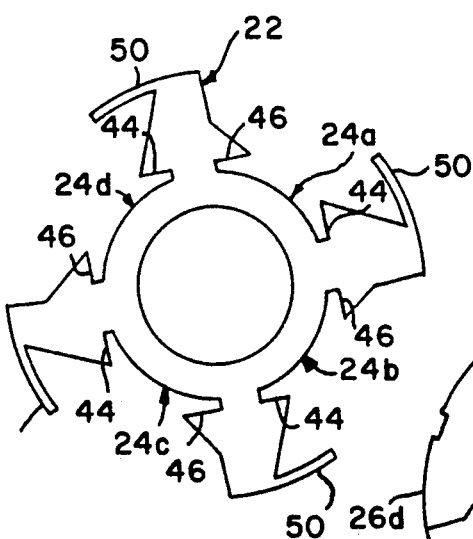
FIG. 2c represents a rotor frame of non-magnetic material in which stacks of rotor segments are installed.
Figure 2D:
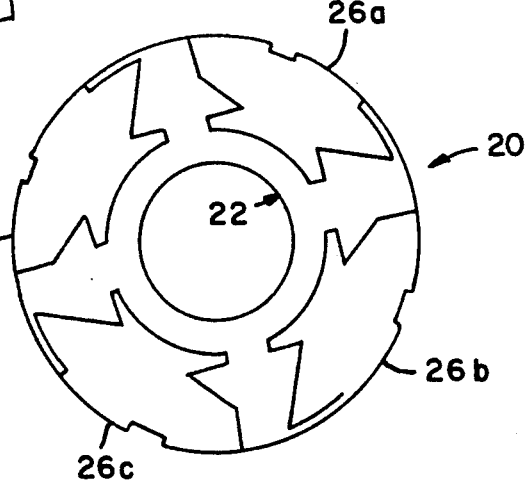
FIG. 2d is an end view of a formed rotor assembly.

As seen in FIG. 2a, a plate 28 is generally trapezoidal in shape and has a curved inner face 30 and a curved outer face 32. The plates are preferably made of a ferromagnetic material and are formed using a half-blanking process. When arranged in stacks as shown in FIG. 2b, a laminate structure indicated generally 34 is formed. Referring to FIG. 2e, the stacks 34 are placed in a mold 36. It will be appreciated that the stacks are of the same height and shape, and when placed in the mold are separated from one another. A non-magnetic material, preferably a light weight aluminum 38, is then poured into the mold to fill the remaining space. When formed, the alumium creates the shape of frame 22 which is shown in FIG. 2c.

The inner face of a plate 28 is generally V-shaped so to form arcuate legs 40, 42. The frame has correspondingly formed recesses 44, 46 in which the legs fit. The recesses thus act as alignment means to properly position the stacks relative to each other. Further, the outer face of each plate has an inset 48 at one end whereby the width of the plate at this end is less than at the opposite end of the plate. Frame 22 has corresponding arms 50 formed at its outer margin adjacent each stack 34. These arms extend across the face of the stacks, in effect, filling in the space removed from the plates by the inset. These arms serve to hold the stacks firmly in place during motor operation. Lastly, each plate has a notch 54 formed in its outer face intermediate the inset and the opposite end of the plate. The notches extend radially inwardly a distance corresponding to a minimum of three times (3×) the width of air gap A. The width of the notch, at the outer face of the plate, corresponds to the width of the space between adjacent stator teeth, at the central bore in the stator (see FIG. 4).

Referring to FIGS. 3a and 3b, the current and voltage waveforms of motor 10 are shown. AS noted, motor 10 is a 2-phase motor having phases A and B. The voltage waveform as shown in FIG. 3a is a generally square-wave in which each voltage pulse is shown to last approximately 120 degrees of angular rotation of the rotor. Because motor 10 is not a synchronous reluctance motor, the voltage waveforms associated with 3-phase and 2-phase synchronous reluctance motors are shown in FIGS. 3b and 3c for purpose of comparison. A 3-phase synchronous motor having phases A, B, and C, has generally sinusoidal waveforms in which the waveform for each phase is 120 degrees out-of-phase with the waveform for each of the other two phases. In a two-phase synchronous motor having phases A and B, the associated waveforms are, again, generally sinusoidal. Now, the waveforms for each phase are generally 180 degrees out-of-phase with the other. (The waveform for phase B in FIG. 3c is shown as a dashed line only for purposes of drawing clarity.) A major reason for the difference in waveforms between motor 10 of the present invention and polyphase synchronous reluctance motors is that motor 10 has no +or−sinusodal rotating fields as are present in synchronous reluctance motors. Also, the synchronous reluctance motor has stator teeth greater than rotor teeth.

The current waveform resulting from the voltage waveform shows a rise from a zero level to a peak. From its peak, the current has an initial fall-off. Thereafter, there is a knee in the curve, followed by a steep decline back to the zero level. It will be understood that the waveform of FIG. 3a is representative only and the actual waveform is a function of a number of factors including: duty or dwell time, the turn-on position of the motor, the pause time between voltage square-wave pulses, and the pulse width modulation of the current regulated. The waveform of FIG. 3a is based upon a square-wave voltage pulse with a dwell time of 75% (135°), and a motor turn-on at the maximum permeance for phase B.

FIGS. 4-7 represent four rotor positions relative to stator 12 during a cycle of motor operation. In FIG. 4, it is seen that the notches 54 in segment stacks 28 are positioned opposite the opening of the B phase poles. This is the position of maximum permeance for phase B and close to the minimum permeance of phase A. It is in this position that the A-phase is turned on.

Figure 5:
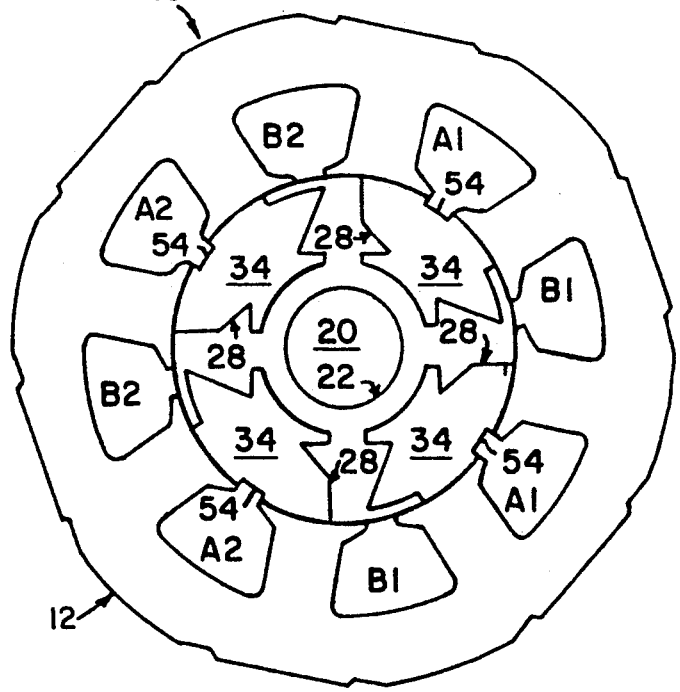
Figures 6, 9:
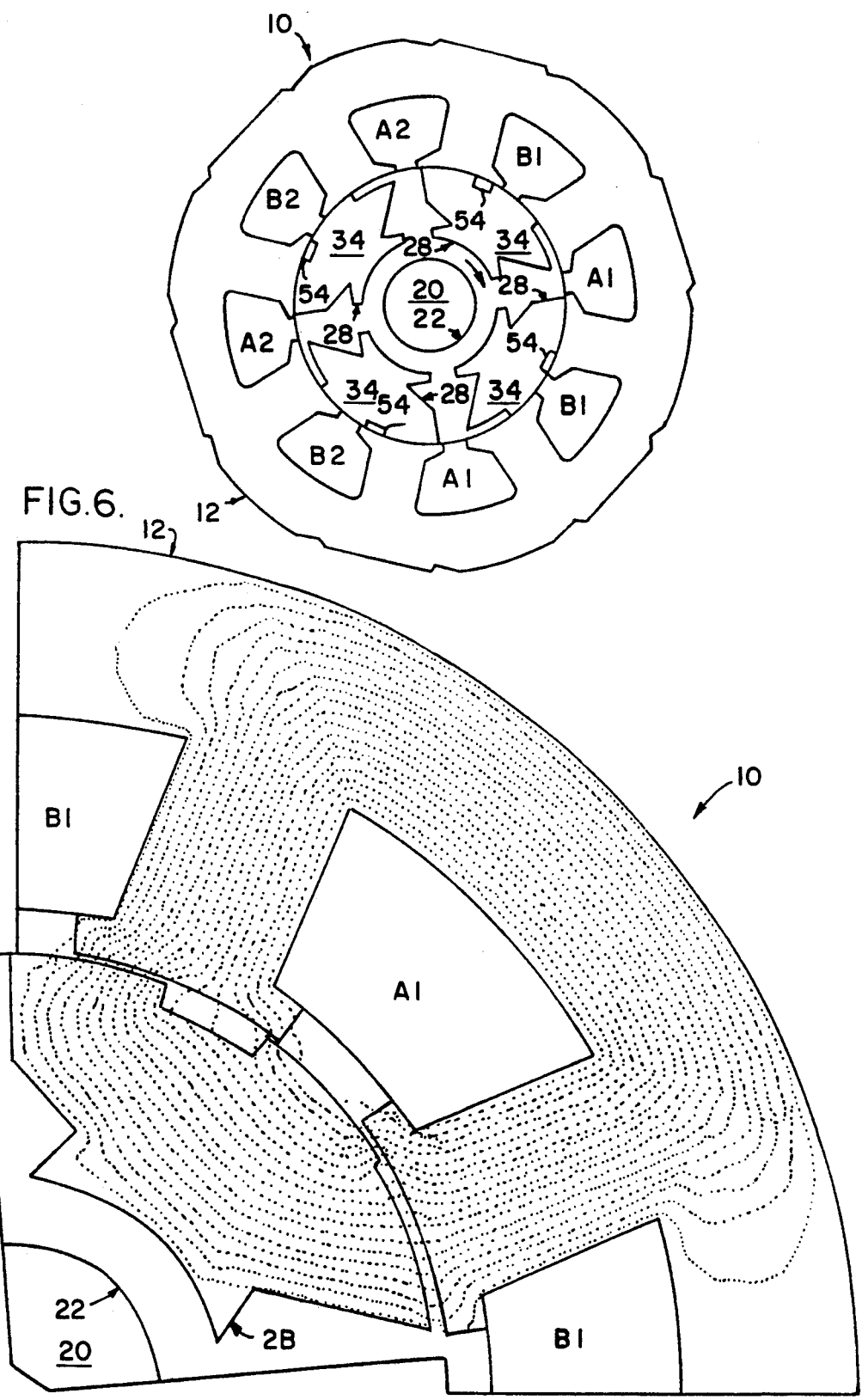
Figure 7:
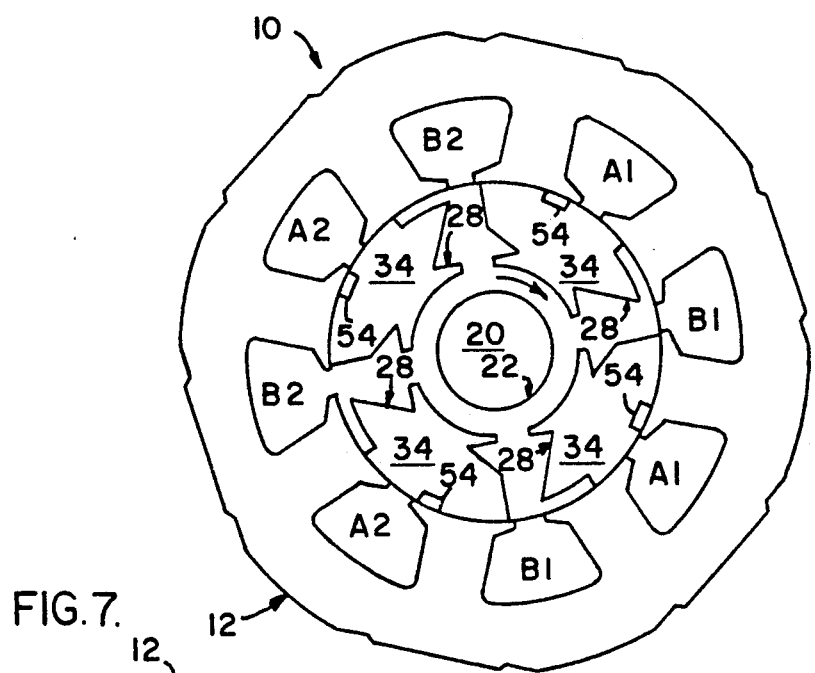

In FIG. 5, the notches 54 are opposite the openings in the stator forming the A phase poles. This is the position of maximum phase A permeance and close to the minimum phase B permeance. In FIG. 6, the rotor has rotated clockwise to a position in which the notches 54 are approaching the phase B poles. At this position, the phase A reluctance is a maximum and the permeance is at a minimum. Lastly, in FIG. 7, the rotor has rotated to where the notches 54 are approaching the phase A poles. In this position, the phase B reluctance is a maximum and its permeance a minimum.

With respect to the notches 54, their function is to produce a distinct maximum permeance position. Preferably, the length of the arc of a notch 54 corresponds, as noted, to widthe of the openings of the stator teeth into the central bore 16. If there were no notches, there would be no preferred starting direction for the motor. Otherwise, the arcuate length of an inset or notch 55 (see FIG. 1) and its depth, determines the motor's starting torque. On the other hand, a smaller arc length of notch 55 and smaller air gap A improves the maximum-to-minimum permeance rate of the motor.

Figure 10:
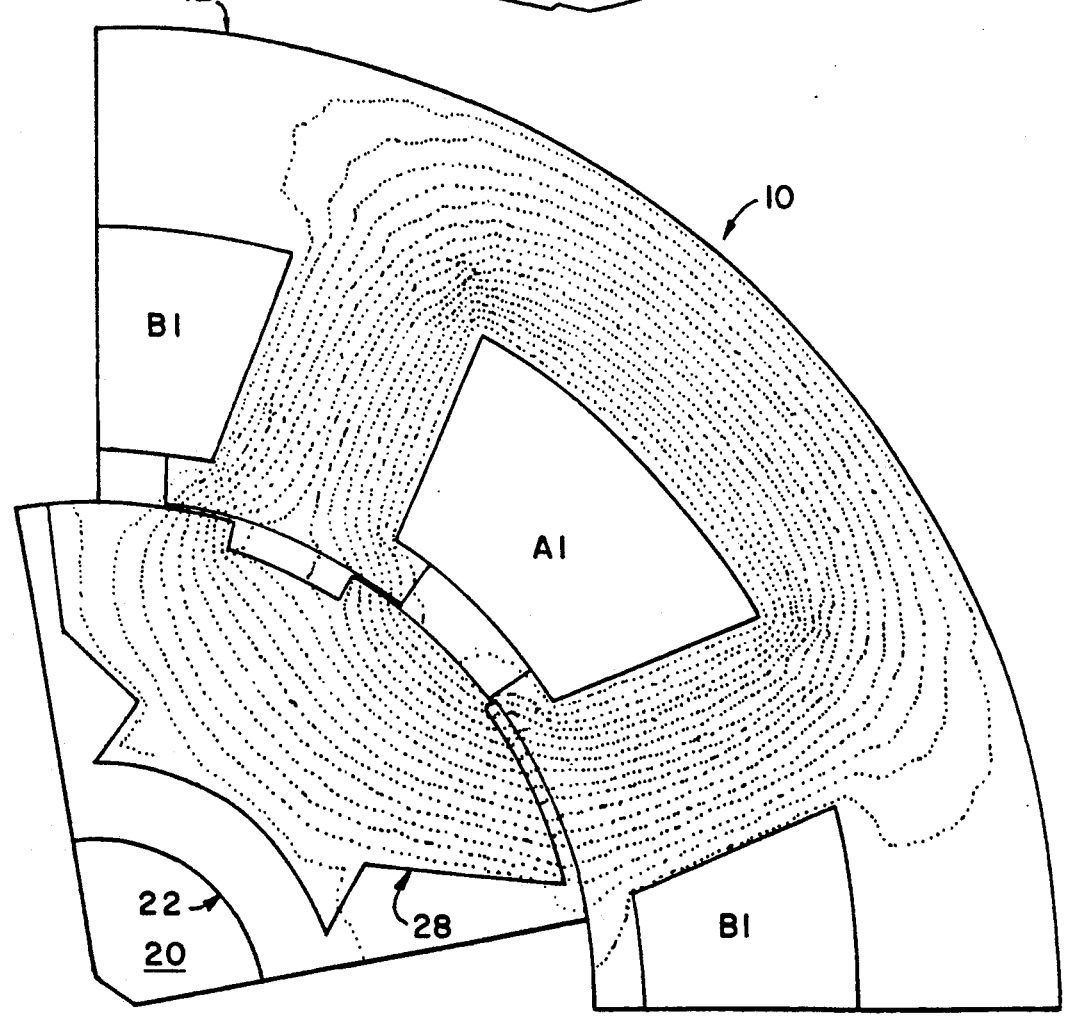
Figure 11:
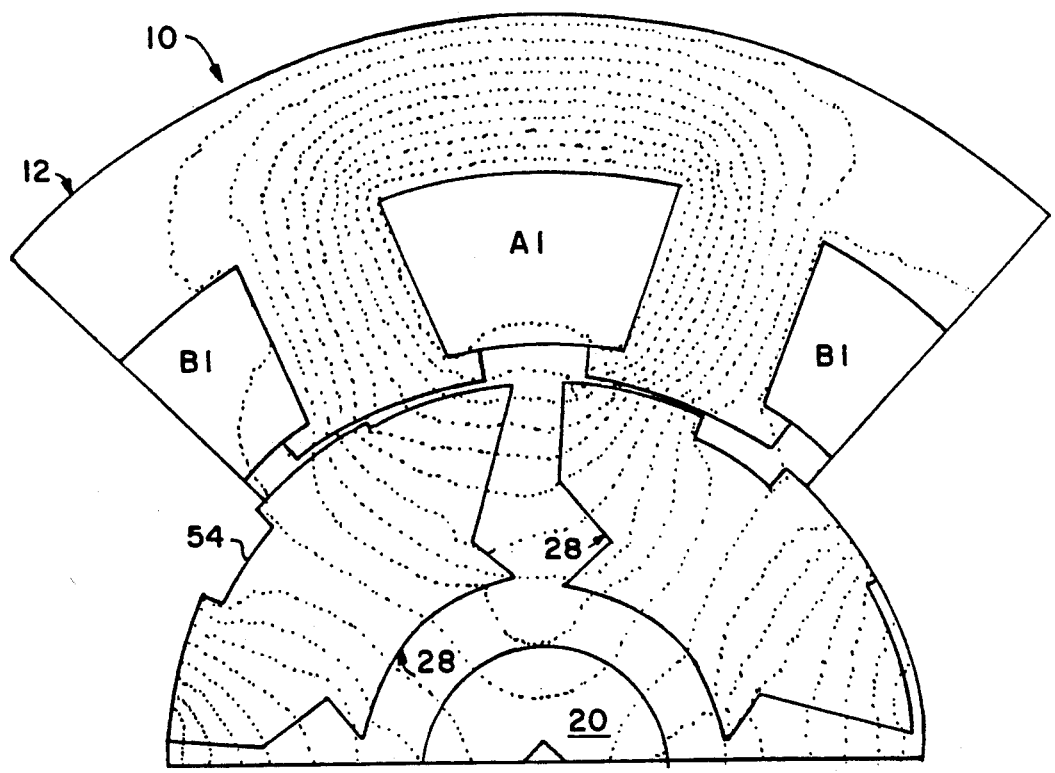

Next, referring to FIGS. 8-12, there are shown a series of flux diagrams. These diagrams are with respect to phase A, but it will be understood that similar diagrams with respect to phase B would be generally similar. FIG. 8 shows the maximum permeance flux pattern for the motor position shown in FIG. 5. FIG. 11 illustrates the minimum permeance flux pattern for the motor position shown in FIG. 6. FIGS. 9 and 10 represent intermediate motor positions. In each FIG. 8-11, the closed lines reflect equipotential. The denser (closer together) these lines are, the higher the flux density.

Figure 12:
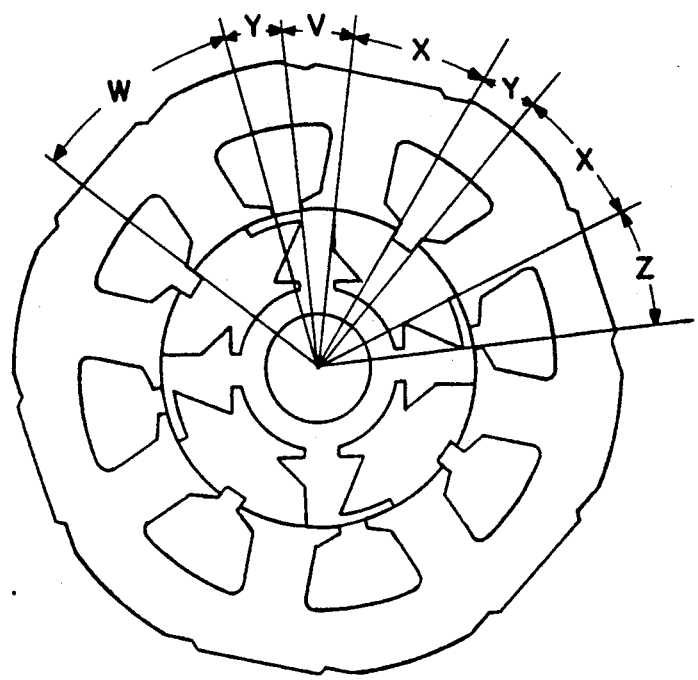

Referring to FIG. 12, it is used in conjunction with Table 1. The table is a listing of possible rotor and stator angle combinations. The columns comprising the table (from left to right) are: the angle between a rotor segment and a stator pole overhand (angle V), the angle subtended by a stator pole (angle W), the angle subtended by a rotor pole (angle X), the angle between the rotor and stator poles (angle y) and the angle of the inset or step in a plate (angle Z). The rightmost column is the result of a critical parameter formula given by the equation.

$$\text{critical parameter} = W - (Z + Y + 3)$$

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A two-phase, unidirectional switched reluctance motor having a rotor comprising a plurality of radially extending pairs of teeth, each tooth being formed of stacked laminations with each stack being magnetically isolated from every other stack of laminations; a stator having a central bore in which the rotor is disposed for rotation, the stator comprising an even and equal number of stator poles and salient teeth; and, magnetizing phase windings with which the stator is wound, the phase windings comprising coils mounted on the stator and spanning two adjacent stator teeth, the windings selectively generating magnetic fields extending from the stator poles into the central bore, the operation of the motor being such that when each phase is energized, all the rotor and stator teeth are producing positive torque for a specific angular span of rotor rotation.

2. The motor of claim 1 wherein the rotor comprises a rotor assembly including a frame formed of a non-

TABLE 1

(number of poles = 8)

| (V) ANGLE BET ROTOR SEG & STATOR POLE MIN (6) | (W) ANGLE STATOR POLE | (X) ANGLE ROTOR POLE (W) − (Y) | (Y) ANGLE BET ROTOR/STATOR POLE 45 − (W)* MIN (5) | (Z) ANGLE STEP 45 − (X)** MAXIMUM (21) | (F) CRITICAL PARAMETER (W) − ((Z) + (y) + 3) MIN 0 |
|---|---|---|---|---|---|
| 6 | 40 | 34 | 5 | 11 | 20 |
|   | 38 | 32 | 7 | 13 | 16 |
|   | 36 | 30 | 9 | 15 | 12 |
|   | 34 | 28 | 11 | 17 | 9 |
|   | 32 | 26 | 13 | 19 | 4 |
|   | 30 | 24 | 15 | 21 | 0 |
| 7 | 40 | 33 | 5 | 12 | 18 |
|   | 38 | 31 | 7 | 14 | 14 |
|   | 36 | 29 | 9 | 18 | 6 |
|   | 32 | 25 | 13 | 20 | 2 |
| 8 | 40 | 32 | 5 | 13 | 16 |
|   | 38 | 30 | 7 | 15 | 12 |
|   | 36 | 28 | 9 | 17 | 8 |
|   | 34 | 26 | 11 | 19 | 0 |
|   | 32 | 24 | 13 | 21 | 0 |
| 9 | 40 | 31 | 5 | 14 | 17 |
|   | 38 | 29 | 7 | 16 | 10 |
|   | 36 | 27 | 9 | 18 | 6 |
|   | 34 | 25 | 11 | 20 | 2 |
| 10 | 40 | 30 | 5 | 15 | 12 |
|   | 38 | 28 | 7 | 17 | 8 |
|   | 36 | 26 | 9 | 19 | 4 |
|   | 34 | 24 | 11 | 21 | 0 |
| 11 | 40 | 29 | 5 | 16 | 10 |
|   | 38 | 27 | 7 | 18 | 6 |
|   | 36 | 25 | 9 | 20 | 2 |
| 12 | 40 | 28 | 5 | 17 | 8 |
|   | 38 | 26 | 7 | 19 | 4 |
|   | 36 | 24 | 9 | 21 | 0 |
| 13 | 40 | 27 | 5 | 18 | 6 |
|   | 38 | 25 | 7 | 20 | 2 |
| 14 | 40 | 26 | 5 | 19 | 4 |
|   | 38 | 24 | 7 | 21 | 0 |
| 15 | 40 | 25 | 5 | 20 | 2 |
| 16 | 40 | 24 | 5 | 21 | 0 |

*Equation is (360°/(pole(s) × 2) − w)
**Equation is (360°/(pole(s) × 2) − x)

With respect to the various values presented, in certain instances minimum or maximum values are indicated.

From the foregoing it will be seen that motor 10 has the advantage of being a true switched reluctance motor with a unique rotor assembly. The result is a smaller motor having the same operational capabilities as larger motors.

magnetic material in which the magnetically active rotor segments are installed.

3. The motor of claim 2 wherein each segment defining a rotor pole is comprised of plates of magnetic material stacked together to form a laminate pole structure.

4. The motor of claim 3 where the stacks of plates are disposable in a mold in a spaced relationship from each other with the non-magnetic material set in the mold about the stacks to form the resultant frame.

5. The motor of claim 3 wherein the plates are half blanked plates which are substantially identical to each other.

6. The motor of claim 5 wherein each plate has a generally trapezoidal shape with curved inner and outer faces.

7. The motor of claim 6 wherein the frame includes means for precisely positioning the stacks of plates about the periphery of the frame whereby the rotor poles have the proper electrical spacing from each other.

8. The motor of claim 7 wherein the plates have a V-shaped inner section and each portion of the frame adjacent the inner end of the plates have recesses in which the legs forming the V's fit thereby to align the stacks of plates with respect to each other.

9. The motor of claim 7 further including means for retaining the stacks of plates in place.

10. The motor of claim 9 wherein an inset is formed at one end on the outer face of each plate and the frame has an arm extending about the outer face of each plate over the insets, the arm locking the stack of plates in place.

11. The motor of claim 9 wherein each plate has a notch formed in its outer margin intermediate the ends of the plate, the notch serving to form an increased air gap between the rotor.

12. The motor of claim 11 wherein the depth of the notch is a minimum of three times the normal air gap between the rotor and stator.

13. The motor of claim 1 wherein the plates are formed of a ferromagnetic material.

14. The motor of claim 1 wherein the non-magnetic material is aluminum.

15. A method of constructing a switched reluctance motor comprising:
stamping laminations for rotor segments from a magnetic material, the laminations being substantially identical;
stacking the laminations into an even number of rotor segment stacks, each stack being the same height and shape, and each stack being physically separated from each other;
forming a notch in the outer face of the stacks of laminations to provide an air gap between the stator and rotor greater than the normal air gap therebetween, the depth of the notch being a minimum of three times the width of the normal air gap;
permanently affixing the rotor segment stacks in place to form the rotor of the motor by molding a non-magnetic material about the stacks, the non-magnetic material functioning to magnetically isolate the stacks from each other;
providing a toothed stator for the motor, the stator having an even number of teeth defining an even number of stator slots, and the stator defining a central bore for the motor;
inserting an even number of phase windings between the stator teeth with adjacent stator slots containing phase windings of opposite polarity; and,
inserting the rotor into the central bore defined by the stator.

16. A two-phase, unidirectional switched reluctance motor comprising:
a stator assembly having a central bore and an even number of stator teeth formed in the stator and spaced evenly around the central bore;
magnetizing phase windings mounted in the stator assembly for generating magnetic fields extending into the central bore, the windings comprising coils which, when installed in the stator, span two adjacent stator teeth; and,
a rotor assembly including a rotor disposed for rotation in the central bore, the rotor including a frame formed of a non-magnetic material and defining an even number of rotor teeth with each rotor tooth being formed of a plurality of stacked laminations and each stack being magnetically isolated from each of the other stacks when installed in the frame, the frame including means for precisely positioning the stacks of plates around the periphery of the frame and for retaining each stack in place as the rotor rotates, and each lamination having a notch formed in its outer margin the depth of which is at least three times the width of a normal air gap between the rotor and stator assemblies.

* * * * *